United States Patent
Sahoo (10) Patent No.: US 6,803,927 B1
(45) Date of Patent: *Oct. 12, 2004

(54) INTELLIGENT PROXY OBJECTS

(75) Inventor: Keshaba Chandra Sahoo, San Rafael, CA (US)

(73) Assignee: Autodesk, Inc., San Rafael, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/512,761

(22) Filed: Feb. 25, 2000

Related U.S. Application Data (63) Continuation of application No. 08/880,184, filed on Jun. 20, 1997, now Pat. No. 6,040,830.

(51) Int. Cl.[7] ................................................ G09G 5/00
(52) U.S. Cl. .................. 345/748; 345/751; 345/752; 707/203; 709/203; 709/217; 709/332; 715/515
(58) Field of Search ................................ 345/704, 748, 345/749, 751, 738, 740, 752, 759; 709/203, 217, 226, 229, 231, 330, 331, 332; 715/515, 516; 707/203, 204

(56) References Cited

U.S. PATENT DOCUMENTS

| 5,638,504 | A | | 6/1997 | Scott et al. ................ 395/7.61 |
| 5,732,270 | A | | 3/1998 | Foody et al. ................ 395/683 |
| 5,881,230 | A | * | 3/1999 | Christensen et al. ........ 709/203 |
| 5,903,725 | A | * | 5/1999 | Colyer ........................ 709/203 |
| 5,922,054 | A | * | 7/1999 | Bibayan ...................... 709/328 |
| 6,182,154 | B1 | * | 1/2001 | Campagnoni et al. ....... 709/315 |
| 6,226,690 | B1 | * | 5/2001 | Banda et al. ................ 709/315 |

* cited by examiner

*Primary Examiner*—Ba Huynh
(74) *Attorney, Agent, or Firm*—Gates & Cooper LLP (57) ABSTRACT

A method, apparatus, and article of manufacture for editing an object created by an object-controlling application program when the object-controlling application program is not available. First, an indication that the object is to be manipulated is received. Then, it is determined that the object-controlling application program is not available to manipulate the object. An intelligent proxy object is created as a placeholder for the object when it is determined that the object-controlling application program is not available. Manipulation operations are performed on the created intelligent proxy object. Further, data relating to the performed manipulation operations is stored.

21 Claims, 6 Drawing Sheets

INTELLIGENT PROXY OBJECTS

CROSS-REFERENCE TO RELATED APPLICATION

This is a continuation of and commonly-assigned patent application Ser. No. 08/880,184, filed on Jun. 20, 1997 U.S. Pat. No. 6,040,830, by Keshaba C. Sahoo, entitled "INTELLIGENT PROXY OBJECTS," now U.S. Pat. No. 6,040,830, issued Mar. 21, 2000, which application is incorporated by reference herein.

BACKGROUND OF THE INVENTION

1. Field of the Invention

This invention relates in general to object-oriented computer systems, and in particular to providing intelligent proxy objects in an object-oriented computer system.

2. Description of Related Art

In some object-oriented computer systems, a word processing program is used to create a document. The document can include an object, such as a spreadsheet object created using a spreadsheet program. When a user is editing the document, the user may want to edit (e.g., modify, display, or print) the spreadsheet object. However, the user can only edit the spreadsheet object if the spreadsheet program is available to the user. When the spreadsheet program is not available, the user must wait for the spreadsheet program to become available in order to edit the spreadsheet object.

There is a need in the art to enable a user to edit an object when its associated application program ("object-controlling application program") is not available.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented object-oriented computer system with intelligent proxy objects.

In accordance with the present invention, an object created by an object-controlling application program can be edited when the object-controlling application program is not available. First, an indication that the object is to be manipulated is received. Then, it is determined that the object-controlling application program is not available to manipulate the object. An intelligent proxy object is created as a placeholder for the object when it is determined that the object-controlling application program is not available. Manipulation operations are performed on the created intelligent proxy object. Further, data relating to the performed manipulation operations is stored.

One of the objects of this invention is to enable modification of an object when its object-controlling application program is unavailable. Another object of this invention is to provide intelligent proxy objects for performing the modifications. Yet another object of this invention is to provide an object-controlling application program with information about modifications made to its associated object in its absence.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Overview

The present invention is a general-purpose application program ("parent application program" or "base application program") that can be used in conjunction with object-controlling application programs. The present invention provides a predetermined set of objects and defines a set of messages to which each of these objects must respond. The present invention also provides a means for introducing additional, custom objects (i.e. "entities") to the object-oriented computer system through the use of object-controlling application programs that work in the context of the present invention. These custom objects must also respond to the set of messages defined by the present invention.

The state of each custom object is stored in a data file. Sometimes the data files for custom objects are transferred to versions of the present invention that do not have the object-controlling application programs that originally created them. In this case, users of the present invention may still want to edit (i.e., manipulate) objects created by the unavailable object-controlling application program. However, the developer of the object-controlling application program may not want these objects to be edited in the absence of the object-controlling application program. Therefore, the present invention provides for limited editing of custom objects whose object-controlling application programs are unavailable, with the object-controlling application programs defining which editing operations are allowed in their absence.

When an object-controlling application program is absent, the present invention invokes an intelligent proxy object generator to generate intelligent proxy objects for modifying, displaying or plotting the custom objects whose object-controlling application programs are not available. The intelligent proxy object is used to preserve the state of the custom object for the object-controlling application program. The intelligent proxy object acts as a surrogate data holder for the custom object in the absence of the object-controlling application program. The intelligent proxy object can provide read-only access to the data of the custom object or provide limited editing capabilities controlled by the object-controlling application program that created the custom object.

Moreover, the editing operations that were performed during the unavailable object-controlling application program's absence are stored. Then, when the object-controlling application program becomes available, it receives the data file for each custom object containing the current state of that custom object and the editing operations that were performed on the custom object in its absence. The object-controlling application program uses the data in the data file to create the custom object to reflect the edits that took place in its absence.

Hardware Environment

Figure 1:
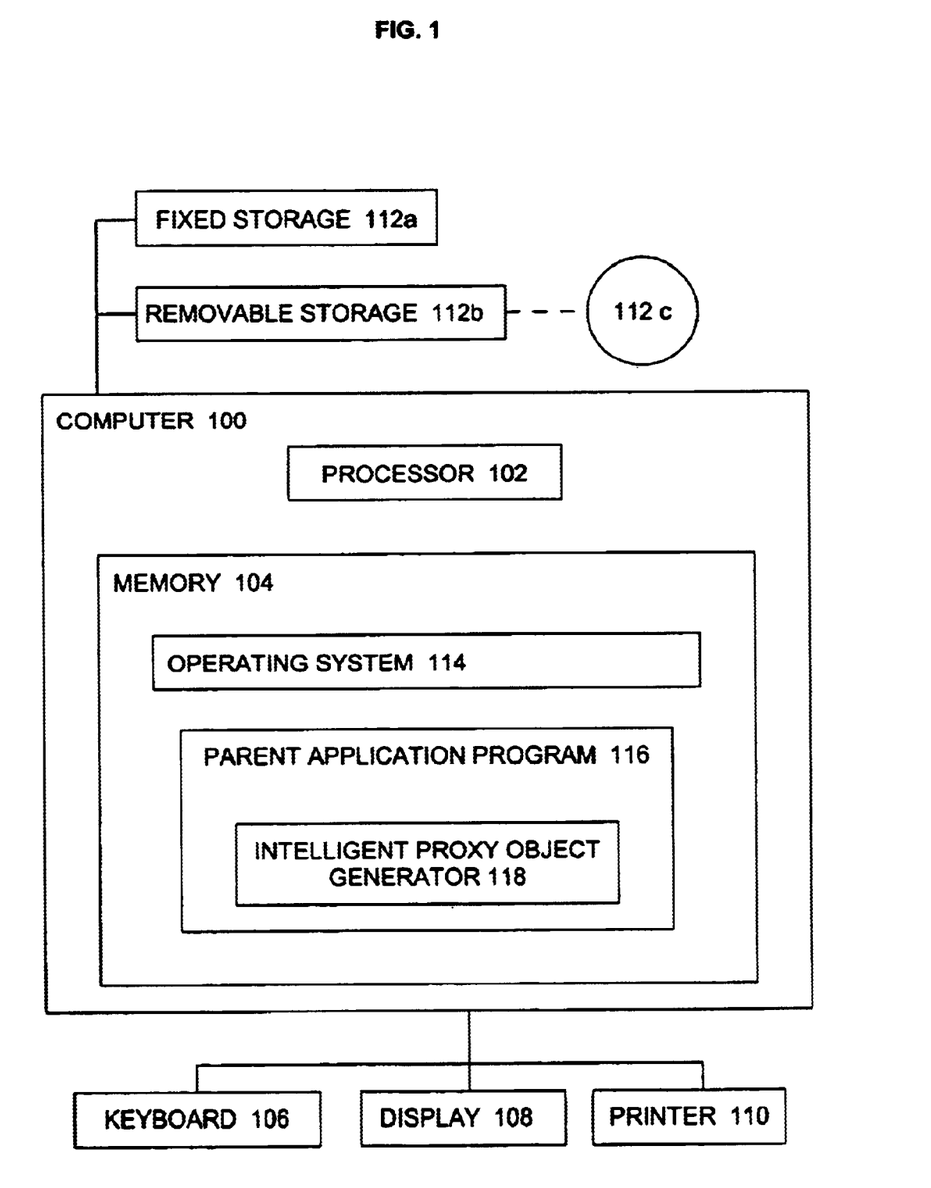
FIG. 1 is a block diagram illustrating an exemplary hardware environment used to implement the preferred embodiment of the present invention.

FIG. 1 is a block diagram illustrating an exemplary hardware environment used to implement the preferred embodiment of the present invention. In the exemplary hardware environment, a computer 100 may include, inter alia, a processor 102, memory 104, keyboard 106, screen display 108, printer or plotter 110, as well as fixed and/or removable data storage devices 112a and 112b, and their associated media 112c. The computer 100 operates under the control of an operating system 114, such as OS/2®, Windows®, Macintosh®, AIX®, UNIX®, DOS®, etc. Those skilled in the art will recognize that any combination of the above components, or any number of different components, peripherals, and other devices, may be used with the computer 100.

The present invention is generally implemented through a parent application program 116, which includes an intelligent proxy object generator 118. Generally, the operating system 114, the parent application program 116, and the intelligent proxy object generator 118 are all tangibly embodied in a computer-readable medium or carrier, e.g., one or more of the fixed and/or removable data storage devices and their associated media 112a–c. Moreover, the operating system 114, the parent application program 116, and the intelligent proxy object generator 118 are comprised of instructions which, when read and executed by the computer 100, causes the computer 100 to perform the steps necessary to implement and/or use the present invention. Under control of the operating system 114, the parent application program 116 and the intelligent proxy object generator 118 may be loaded from the data storage devices 112a–c into the memory 104 of the computer 100 for use during actual operations in implementing and/or performing the present invention.

Parent Application Program

A parent application program 116, such as the AutoCAD® computer program sold by Autodesk, Inc., the assignee of the present invention, allows other application programs (i.e., "parent" application programs) to create custom objects. Examples of custom objects include geographic objects, such as line objects. Each custom object is defined by its state, and its state information is stored in a data file (i.e., drawing file) having a .dwg file format. A drawing file is in a database format that recognizes embedded objects.

When a custom object is created, the object-controlling application program, which is associated with the custom object, defines custom object visual representations, which are stored in the drawing file for the custom object. These are comprised of graphical primitives that define the state of the custom object. The intelligent proxy object generator 118 uses the custom object visual representations to generate intelligent proxy objects.

Figure 2:
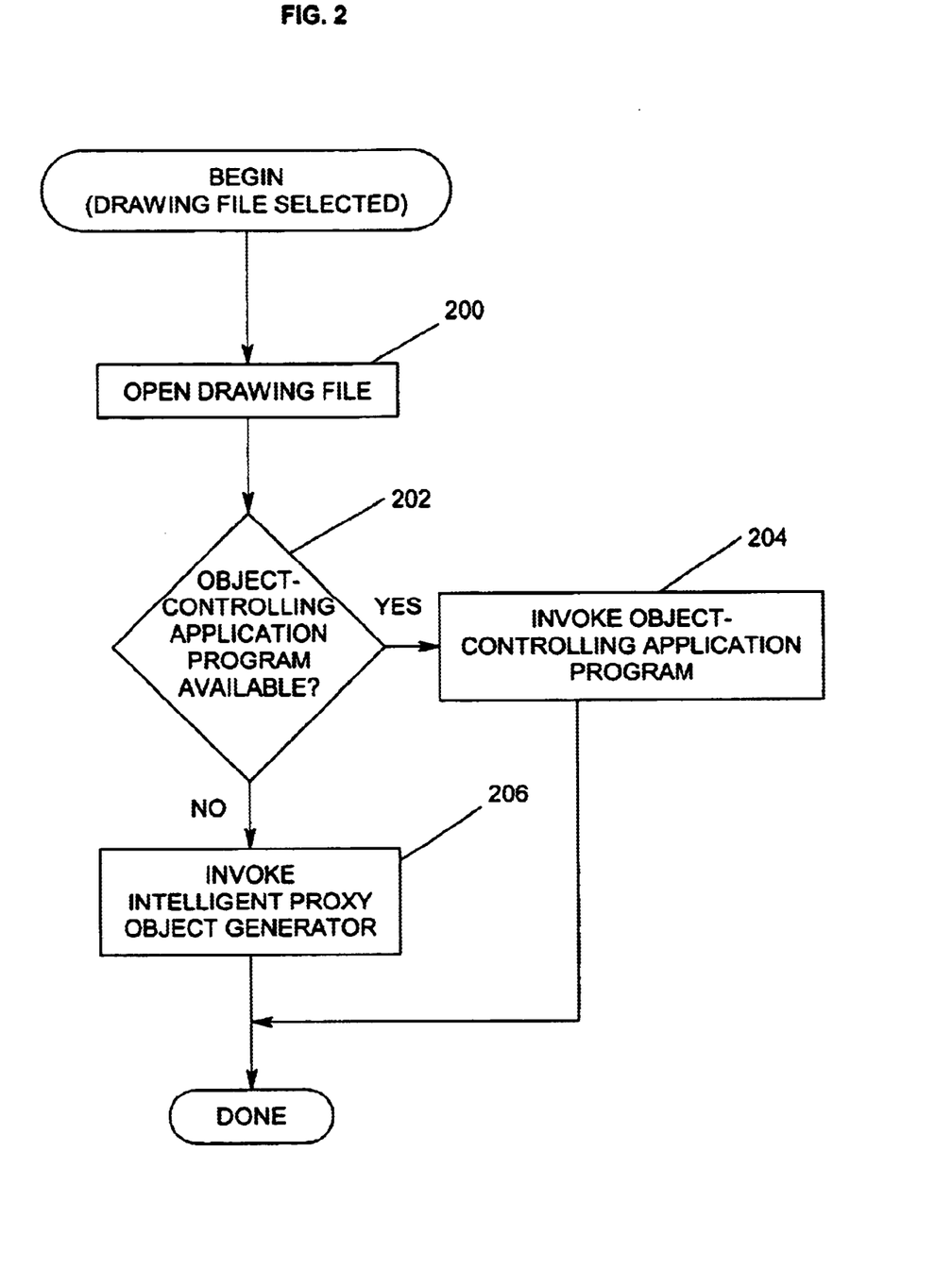
FIG. 2 is a flow diagram illustrating the steps that are performed by the parent application program when a drawing file is selected.

It is possible that the drawing file for a custom object will be opened when the object-controlling application program for the custom object is not available. FIG. 2 is a flow diagram illustrating the steps that are performed by the parent application program 116 when a drawing file is to be opened. Block 200 represents the parent application program 116 opening the drawing file.

When a drawing file containing custom objects whose object-controlling application programs have permitted intelligent proxy objects is opened, the parent application program 116 will automatically try to load the object-controlling application program or programs associated with the objects in the drawing. When an object-controlling application program is initially installed with the parent application program 116, the object-controlling application program will write application information to a registry. The parent application program 116 provides an application programming interface (API) through which application developers can create and maintain an entry for their object-controlling application programs in the parent application program's section of the registry. When the parent application program 116 finds a custom object that can be modified through an intelligent proxy object, the parent application program 116 will look in the registry to see if and where the object-controlling application program is installed and try to load the object-controlling application program.

Block 202 represents the parent application program 116 determining whether the drawing file contains a custom object whose object-controlling application program is available. When the object-controlling application program is available, Block 204 represents the parent application program 116 invoking the object-controlling application program. When the object-controlling application program is not available; Block 206 represents the parent application program invoking the intelligent proxy object generator 118 to create an intelligent proxy object as a placeholder for the custom object.

When a drawing file is opened, the displaying of intelligent proxy objects is controlled by the PROXYGRAPHICS variable. The PROXYGRAPHICS variable controls how the metafile geometry will be displayed to the user. It has the following possible settings:

| | |
|---|---|
| 0 | Do not display intelligent proxy objects. |
| 1 | Display full representation of all intelligent proxy objects. |
| 2 | Display only a bounding box for intelligent proxy objects. |

Figure 3:
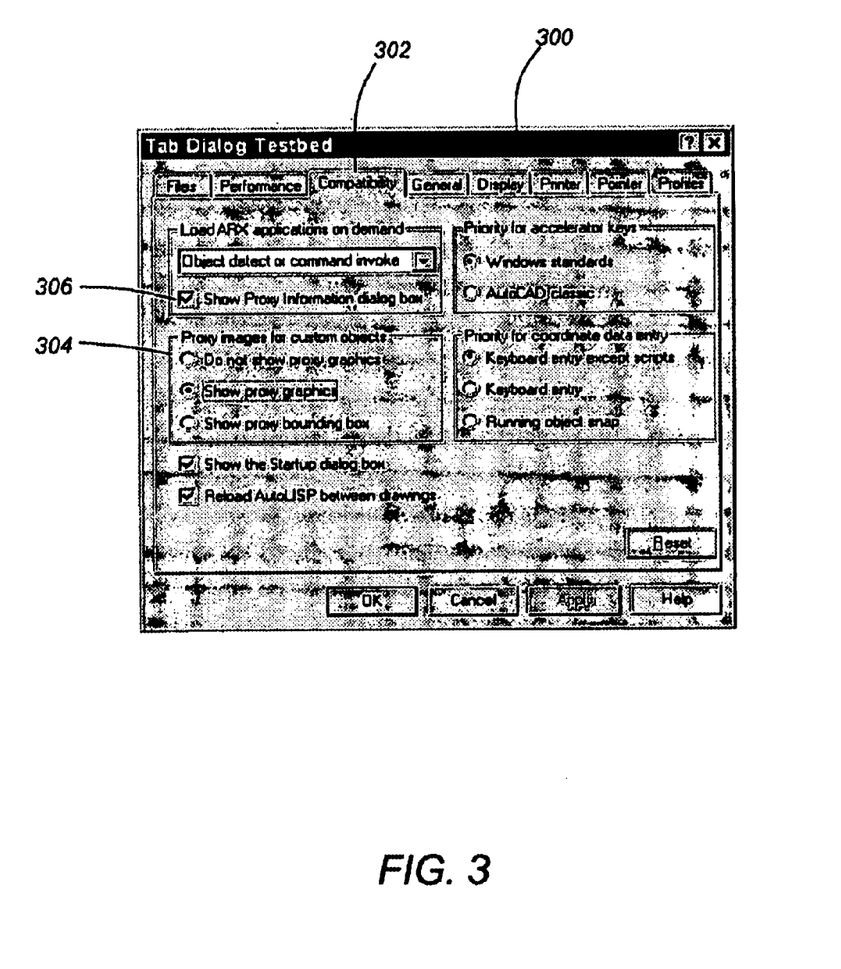
FIG. 3 is a block diagram illustrating a tab dialog box displayed by the parent application program.

The default setting of the PROXYGRAPHICS variable is 1. The PROXYGRAPHICS variable is set using a user interface. FIG. 3 is a block diagram illustrating a tab dialog box 300 displayed by the parent application program 116. The tab dialog box 300 contains a compatibility tab 302. When the compatibility tab 302 is selected, three radio buttons are displayed in the proxy images for custom objects box 304. The radio buttons enable selection of the settings for the PROXYGRAPHICS variable.

Intelligent Proxy Object Generator

When the intelligent proxy object generator 118 is invoked, the intelligent proxy object generator 118 displays intelligent proxy objects in place of custom objects. If a PROXYNOTICE variable is set, the intelligent proxy object generator 116 displays a dialog box notifying a user that intelligent proxy objects are present in the drawing that is being opened. The PROXYNOTICE variable has the following possible settings:

| | |
|---|---|
| 0 | Do not display proxy notice dialog box. |
| 1 | Display proxy notice dialog box at open command and for each command that results in intelligent proxy object creation. |

The default setting is 1. The user interface for this variable is illustrated in FIG. 3. The PROXYNOTICE variable is set using a check box 306 in the compatibility tab 302 of the tab dialog box 300.

Figure 4:
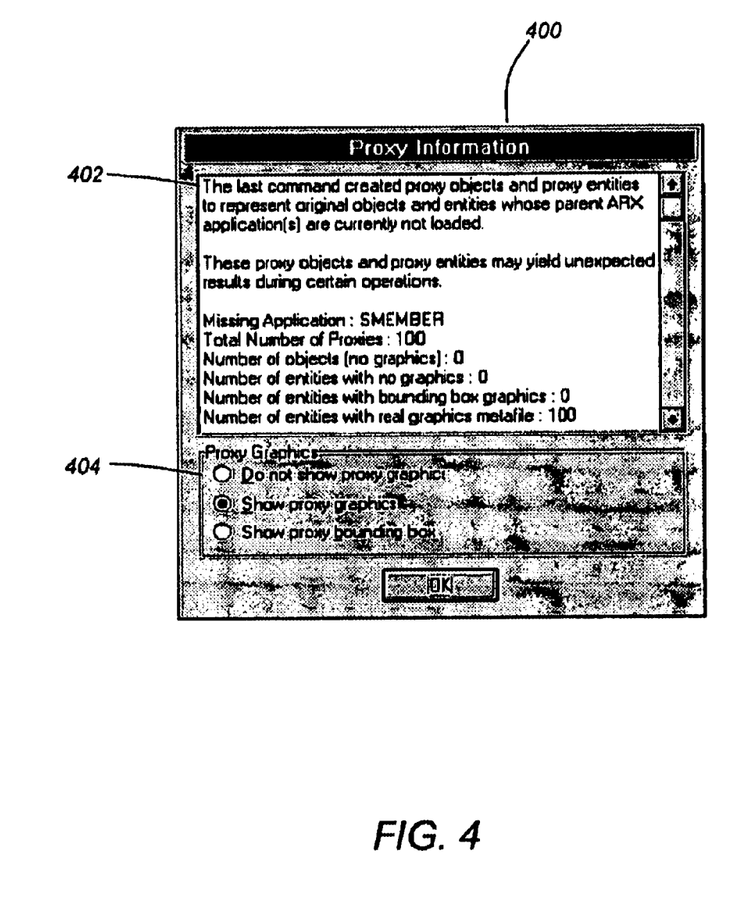
FIG. 4 is a block diagram illustrating a proxy information dialog box displayed by the intelligent proxy object generator.

FIG. 4 is a block diagram illustrating a proxy information dialog box 400 displayed by the intelligent proxy object generator 118. The proxy information dialog box 400 is displayed when the PROXYNOTICE variable is set. The proxy information dialog box 400 contains a data box 402 that identifies the object-controlling application program or programs that are not available. The proxy information dialog box 400 also contains proxy graphics options 404 that enable a user to indicate whether and how proxy graphics should be displayed. The proxy information dialog box 400 is also displayed after a command is executed that causes intelligent proxy objects to be created.

Figure 5:
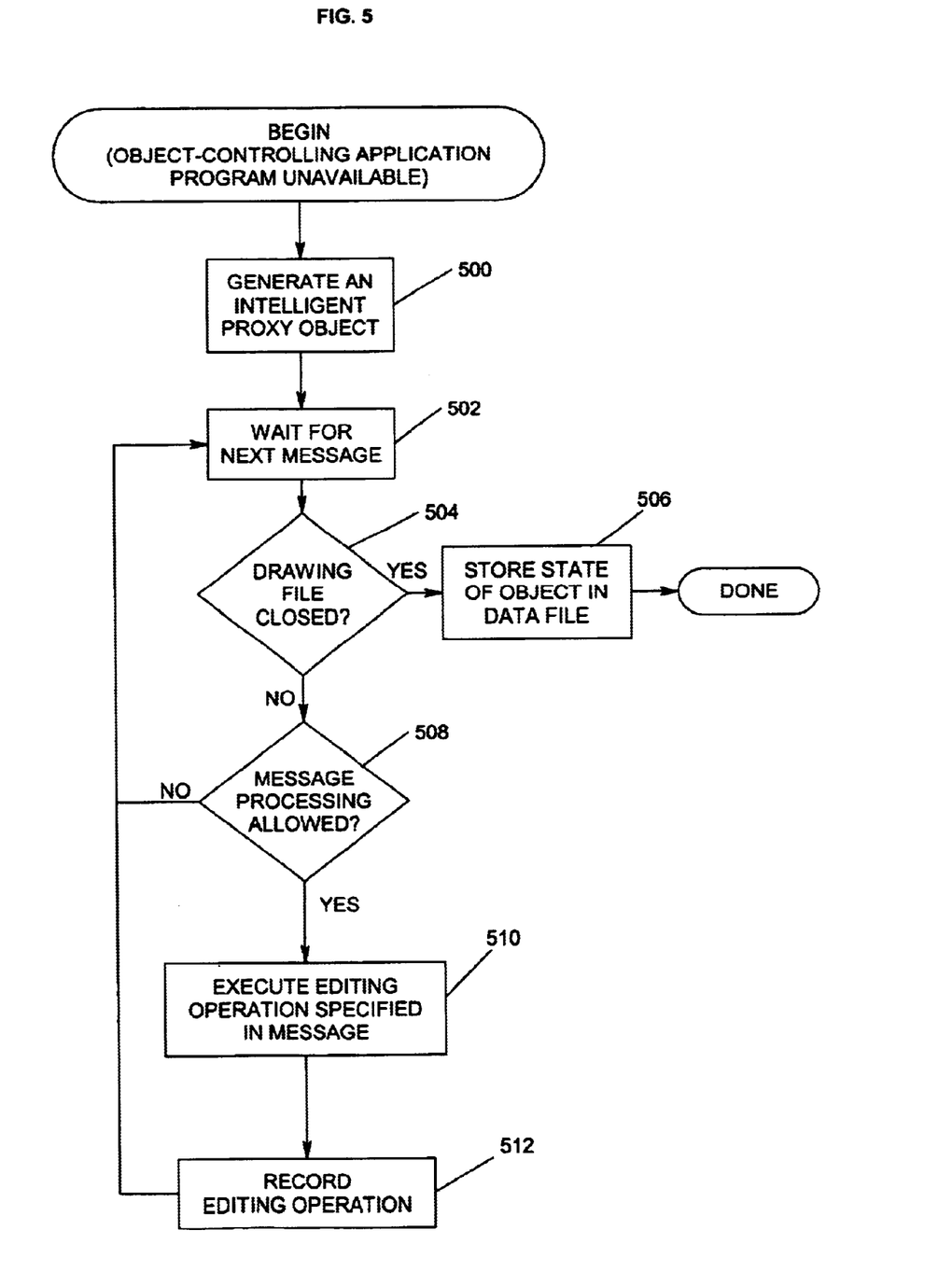
FIG. 5 is a flow diagram illustrating the steps performed by the intelligent proxy object generator to process messages.

FIG. 5 is a flow diagram illustrating the steps performed by the intelligent proxy object generator 118 to 1S process messages. Block 500 represents the intelligent proxy object generator 118 generating an intelligent proxy object when an object is selected for which the object-controlling application program is not available. Block 502 represents the intelligent proxy object generator 118 waiting for a message to edit the intelligent proxy object.

The parent application program 116 requires that each object be able to handle messages requesting to "file in" or "file out" the unique data which defines its state at a particular time. Additionally, intelligent proxy objects can process selected messages without any loss of data integrity.

The object-controlling application program defines the messages to which the intelligent proxy object can respond when the object-controlling application program is absent. The messages are typically editing operations such as modifying, displaying or printing the text of the object. The object-controlling application program uses an application program programming interface (API) to specify the individual messages to which an intelligent proxy object can respond. This specification is encoded as a bit-field and is stored with general information about the object-controlling application program by the parent application program 116. This data is stored with the other information about the session in the parent application program's data file, and is hence accessible by an intelligent proxy object created in a subsequent session.

In particular, the object-controlling application program sets a bit-field for a custom class indicating which editing operations can be performed by an intelligent proxy object for a custom object of that custom class. The intelligent proxy object generator 118 stores the custom class bit coded value that will be set by the object-controlling application as to which editing operations, if any, should be allowed on instances of that class when those instances are in intelligent proxy object form. This information can be stored in the class identifier section or in a dictionary in the named object dictionary. When the drawing files are loaded, this information is read and cached so that it does not have to be looked up for each editing operation on an intelligent proxy object.

Some object-controlling application programs may want to allow all or some editing functions while other object-controlling application programs may not want to allow any editing functions. Therefore, the following flags can be set by an object-controlling application program to define the allowed editing functions. The flags are:

| | |
|---|---|
| kNoEditingProxy | No editing allowed. |
| kEraseProxy | Erasing allowed. |
| kMakeInvisibleForErase | Invisible erase allowed. |
| kTransformProxy | Transform allowed. |
| kColorChangeAllowed | Color change allowed. |
| kLayerChangeAllowed | Layer change allowed. |
| kLinetypeChangeAllowed | Line type change allowed. |
| kLtScaleChangeAllowed | Scale change allowed. |
| kVisibilityChangeAllowed | Visibility change allowed. |
| kAllAllowedBits | All of the above editing functions are allowed. |

Block 504 represents the intelligent proxy object generator 118 receiving a message and determining whether the message indicates that the drawing file is to be closed. When the drawing file is to be closed, block 508 represents the intelligent proxy object generator 118 storing the state of the intelligent proxy object in the drawing file.

When the message received in Block 502 is not one indicating that the drawing file is to be closed, Block 508 represents the intelligent proxy object generator 118 determining whether the intelligent proxy object is allowed to process the received message. The intelligent proxy object generator 118 makes this determination by checking the flags set for intelligent proxy objects of the custom class.

Block 510 represents the intelligent proxy object generator 118 executing the editing operation specified by the message. Block 512 represents the intelligent proxy object recording information about the editing operation it performs so that when the object-controlling application program is available, the object-controlling application program can be notified of the editing operations that were performed on the object in its absence.

Object-oriented computer systems typically allow an arbitrary chunk of data to be attached to an object. To allow the recording and replay of messages sent to the intelligent proxy object during a particular session, the intelligent proxy object generator 118 attaches chunks of data to a particular object. Each of the relevant messages that an intelligent proxy object receives is encoded and stored as part of the intelligent proxy object data. This data is stored in the object-controlling application program's-data file. Then, when the object-controlling application program is available, the object-controlling application program can retrieve this information from its data file and determine which editing operations were performed in its absence. When the drawing file is reopened, the object-controlling application program uses the information to update the custom objects to reflect the editing operations that occurred when the object-controlling application program was not available.

When the drawing file is closed, if a PROXYSAVE variable is set, metafile geometry is saved with the drawing in the drawing file. The PROXYSAVE variable has the following possible settings:

| | |
|---|---|
| 0 | Save boundary box only |
| 1 | Save graphics and boundary box |

The default setting of the PROXYSAVE variable is 0. Whether graphics of the custom object are saved or not, a bounding box of the intelligent proxy object is always saved.

Figure 6:
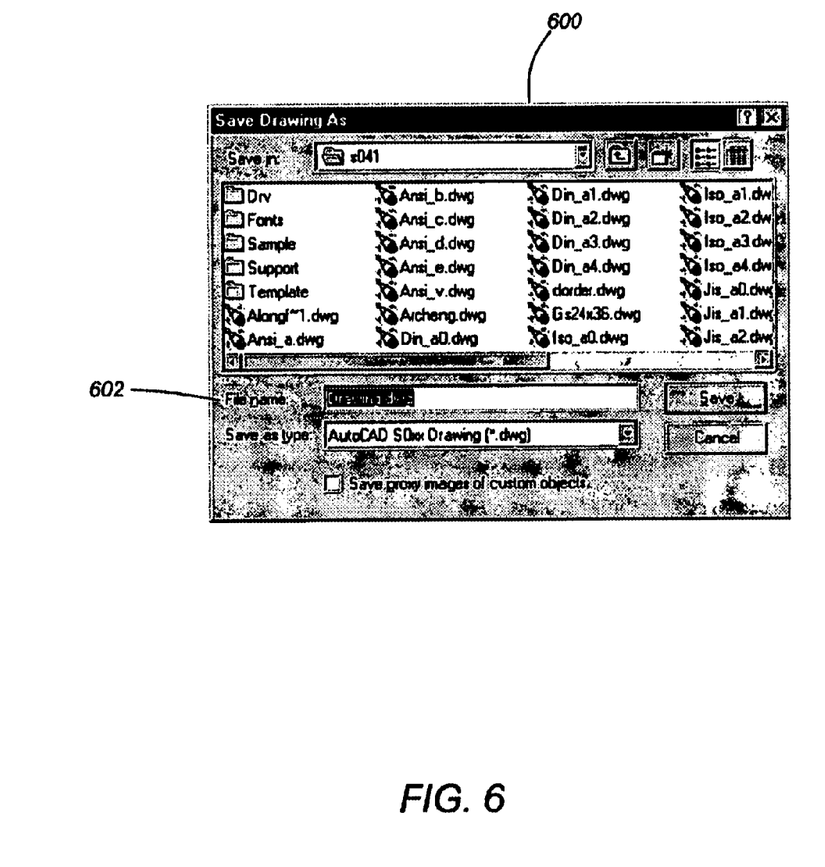
FIG. 6 is a block diagram illustrating the save drawing dialog box displayed by the parent application program.

The PROXYSAVE variable is set through a user interface, such as a check box in the save drawing dialog box. FIG. 6 is a block diagram illustrating the save drawing dialog box 600 displayed by the parent application program 116. The save drawing dialog box enables saving the drawing in a .dwg format in the file name box 602.

In an alternative embodiment, intelligent proxy objects include the ability to explode intelligent proxy objects into their constituent geometrical members, provide boundary geometry support, extend the metafile to include spline and ellipses, provide DXF file round-trip of intelligent proxy object data, enable querying an intelligent proxy object for the name of its object-controlling application program, and provide additional support for Lisp and ADS applications to query intelligent proxy objects.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, users of custom objects can perform common editing operations on the objects in their model even if, for some reason, they do not have all the necessary application programs present on their system. Any editing operations performed on an intelligent proxy object during one session will be correctly reflected in the custom object in any later sessions when the object-controlling application program is available.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for manipulating an object in an object-oriented computer system, comprising:

(a) determine in a parent application program whether an object-creating program that created the object is available to edit the object; and (b) creating and editing an intelligent proxy object in the parent application program as a surrogate for the object when the object-creating program is not available.

2. The method of claim 1, wherein the determining step comprises:

attempting to load the object-creating program, so that the object-creating program can be used to manipulate the object; and determining that the object-creating program is not available to manipulate the object when the attempt to load the object-creating program fails.

3. The method of claim 1, wherein the creating and editing step comprises manipulating the intelligent proxy object rather than the object, so that any changes resulting from the manipulations are stored in the intelligent proxy object rather than the object.

4. The method of claim 3, wherein the creating and editing step comprises sending messages to the intelligent proxy object, wherein the object-creating program defines the messages to which the intelligent proxy object can respond when the object-creating program is not available.

5. The method of claim 4 above, wherein the creating and editing step further comprises performing only those manipulations corresponding to messages defined by the object-creating program.

6. Thee method of claim 5 above, wherein the manipulations further comprise editing operations.

7. The method of claim 1 above, further composing manipulating the object under control of the object-creating program, when the object-creating program later becomes available, so that the object reflects the manipulations that were performed on the intelligent proxy object when the object-creating program was not available.

8. An apparatus for manipulating an object, comprising:

(a) an object-oriented computer system; and means, performed by the object-oriented computer system, for determining in a parent application program whether an object-creating program that created the object is available to edit the object, and for creating and editing an intelligent proxy object in the parent application program as a surrogate for the object when the object-creating program is not available.

9. The apparatus of claim 8, wherein the means for determining comprises:

means for attempting to load the object-creating program, so that the object-creating program can be used to manipulate the object; and means for determining that the object-creating program is not available to manipulate the object when the attempt to load the object-creating program fails.

10. The apparatus of claim 8, wherein the means for creating and editing comprises means for manipulating the intelligent proxy object rather than the object, so that ay changes resulting from the manipulations are stored in the intelligent proxy object rather than the object.

11. The apparatus of claim 10, wherein the means for creating and editing comprises means for sending messages to the intelligent proxy object, wherein the object-creating program defines the messages to which the intelligent proxy object can respond when the object-creating program is not available.

12. The apparatus of claim 11 above, wherein the means for creating and editing further comprises means for performing only those manipulations corresponding to messages defined by the object-creating program.

13. The apparatus of claim 12 above, wherein the manipulations further comprise editing operations.

14. The apparatus of claim 8 above, further comprising means for manipulating the object, under control of the object-creating program, when the object-creating program later becomes available, so that the object reflects the manipulations that were performed on the intelligent proxy object when the object-creating program was not available.

15. An article of manufacture embodying one or more instructions executable by an object-oriented computer system to perform a method for manipulating a object, the method comprising:

(a) determining in a parent application program whether an object-creating program that created the object is available to edit the object; and (b) creating and editing an intelligent proxy object in the parent application program as a surrogate for the object when the object-creating program is not available.

16. The method of claim 15, wherein the determining step comprises:

attempting to load the object creating program, so that the object-creating program can be used to manipulate the object; and determining that the object-creating program is not available to manipulate the object when the attempt to load the object-creating program fails.

17. The method of claim 15, wherein the creating and editing step comprises manipulating the intelligent proxy object rather than the object, so at any changes resulting from the manipulations are stored in the intelligent proxy object rather than the objects.

18. The method of claim 17, wherein the creating and editing step comprises sending messages to the intelligent proxy object, wherein the object-creating program defines the messages to which the intelligent proxy object can respond when the object-creating program is not available.

19. The method of claim 18 above, wherein the creating and editing step further comprises performing only those manipulations corresponding to messages defined by the object-creating program.

20. The method of claim 19 above, wherein the manipulations further comprise editing operations.

21. The method of claim 15 above, further comprising manipulating the object, under control of the object-creating program, when the object-creating program later becomes available, so that the object reflects the manipulations that were performed on the intelligent proxy object when the object-creating program was not available.

* * * * *

UNITED STATES PATENT AND TRADEMARK OFFICE
CERTIFICATE OF CORRECTION

PATENT NO. : 6,803,927 B1
DATED : October 12, 2004
INVENTOR(S) : Keshaba Chandra Sahoo It is certified that error appears in the above-identified patent and that said Letters Patent is hereby corrected as shown below:

Column 8,
Line 9, "composing" should read -- comprising --.
Line 17, before "means" insert -- (b) --.
Line 34, "ay" should read -- any --.
Line 57, "a" should read -- an --.

Column 9,
Line 11, "at" should read -- that --.
Line 13, "objects" should read -- object --.

Signed and Sealed this

Fifteenth Day of March, 2005

JON W. DUDAS
*Director of the United States Patent and Trademark Office*